Figure 1:
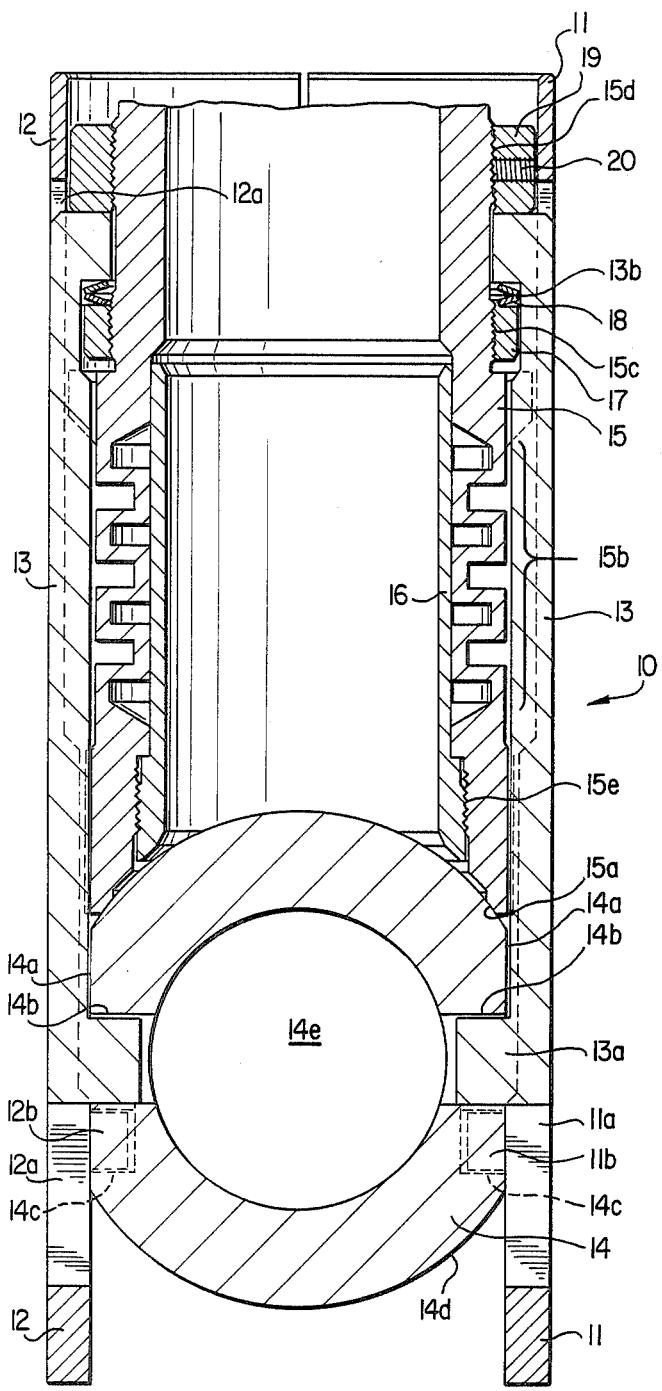

United States Patent [19]

Perkins

[11] Patent Number: 4,738,431
[45] Date of Patent: Apr. 19, 1988

[54] BALL VALVE STRUCTURE

[75] Inventor: Donald H. Perkins, Carrollton, Tex.

[73] Assignee: Otis Engineering Corporation, Dallas, Tex.

[21] Appl. No.: 942,998

[22] Filed: Dec. 18, 1986

[51] Int. Cl.$^4$ ............................................. F16K 1/14
[52] U.S. Cl. .................................. 251/188; 251/346; 166/332
[58] Field of Search ................ 251/58, 188, 346, 351; 166/319, 332

[56] References Cited

U.S. PATENT DOCUMENTS 3,583,442  6/1971  Dollison .................. 137/630.19
4,293,038  10/1981  Evans ....................... 166/332 X
4,319,634  3/1982  McMahan et al. ........ 166/332 X Primary Examiner—A. Michael Chambers
Assistant Examiner—John C. Fox
Attorney, Agent, or Firm—Roland O. Cox

[57] ABSTRACT

Disclosed is an improved ball valve structure and a well safety valve utilizing the improved ball valve. The improved valve includes a metal seat member having a resilient section and control arms, which may be positioned to initially sealingly engage the seat with the ball and to compress the seat resilient section to control the force sealingly engaging the seat with the metal ball and thereby limit frictional forces opposing opening rotational forces when pushing on the seat to open the valve. The control arms are positioned by rings threaded on the seat above the control arms and below a shoulder in each arm. When the seat is moved down to open the ball valve, opening rotational forces are imparted to the valve ball through both the seat and control arms. The well safety valve utilizing the improved ball valve structure includes an annular metal valve and means increasing the force sealingly engaging the seat with the valve ball as pressure below the closed ball valve increases.

28 Claims, 2 Drawing Sheets

BALL VALVE STRUCTURE

The present invention relates to valves in general and particularly to ball valves of the type which have a through flow passage and are moveable between open and closed positions to control flow through the passage.

Many ball valve forms and mechanisms for rotating the ball member between open and closed positions have been developed and used. A number of these various forms developed for ball valves useful in wells are shown in the following U.S. Pat. Nos.:

2,894,715 to J. H. Bostock,
3,007,669 to J. V. Fredd,
3,583,442 to W. W. Dollison and
Re.25,471 thereof,
3,826,462 to F. H. Taylor,
4,149,698 to T. M. Deaton,
4,214,606 to T. M. Deaton and G. A. Kohn,
4,535,968 to J. C. Gano and G. A. Kohn,
4,566,478 to T. M. Deaton, and
4,569,397 to W. L. Brakhage, Jr. and T. R. Cupples.

Rotation of the ball member in the mechanisms shown in U.S. Pat. Nos. 3,583,442 and 4,149,698 is accomplished by moving the ball longitudinally down or up relative to off-center pins fixed in a housing and engaged in slots on parallel opposed flats on the ball or pins fixed in the body and engaged in the ball flat slots. Longitudinal movement and ball rotation around the pins can be accomplished most times by pushing on the ball through a seat member held engaged with the ball by control arms or by pushing on the control arms, which move the ball through control arm pins engaged in center holes in the ball. When pushing on the seat to move the ball downwardly rotating it to open position, friction between the ball and seat oppose ball rotational forces. The ball and seat friction forces act on a longer moment arm than that of the housing pins imparting rotating forces to the ball. It can be seen that if the frictional coefficient between ball and seat becomes large enough, sufficient rotational forces cannot be applied to the ball when pushing on the seat and the ball valve is "locked" closed and cannot be rotated open as more down force on the seat increases the friction forces opposing the rotating forces.

When pushing the ball through the control arms, the frictional forces opposing ball rotation are between the control arm pins and the ball center holes and act on much shorter moment arms than the ball rotating forces imparted by the longer moment arms of the housing pins. Even if the frictional coefficient increases, more push on the control arms imparts more rotational force on the ball.

Also, with necessary operating clearances between parts in ball valves of previous art designs, the valve ball may move out of sealing engagement with the seat seal surface during operation.

The structure of this invention provides for pushing both through the control arms and the seat to open the ball valve. The majority of the push force is transmitted through the control arms while the force pushed through the seat that is transmitted to the ball is limited by a compressed resilient section in the seat. The control arms may be positioned to initially bring the ball into sealing engagement with the seat and to compress the resilient seat section to limit the seat sealing surface on ball load. As the seat is held in sealing engagement with the ball by compressing a resilient seat section, and all parts are moved into contact when the seat on ball load is determined by positioning the control arms, the seat is held in sealing engagement with the ball at all times during operation of the present invention.

An object of this invention is to provide an improved ball valve having metal sealing surfaces.

An object of this invention is to provide an improved ball valve wherein opening rotation forces are applied to the ball through the control arms and limited opening forces are applied through the seat.

An object of this invention is also to provide an improved ball valve wherein the control arms may be positioned to sealingly engage the seat with the ball and control the force sealingly engaging the seat with the ball.

An object of this invention is to provide an improved ball valve wherein the control of force sealingly engaging the seat with the ball reduces rotational frictional forces opposing opening rotational forces imparted to the valve ball.

Also, an object of this invention is to provide an improved ball valve wherein the seat is sealingly engaged with the valve ball at all times during operation between open and closed positions.

Another object of this invention is to provide a well safety valve utilizing the improved ball valve.

An object of this invention is to provide a well safety valve incorporating the improved ball valve structure.

Also, an object of this invention is to provide a well safety valve wherein pressure below on the closed improved ball valve acts to increase the force sealingly engaging the seat with the valve ball member.

Another object of this invention is to provide a well safety valve having an all metal ball and annular valves.

FIG. 1 is a half sectioned drawing in elevation of the improved ball valve structure of this invention in closed position.

Figure 2A:
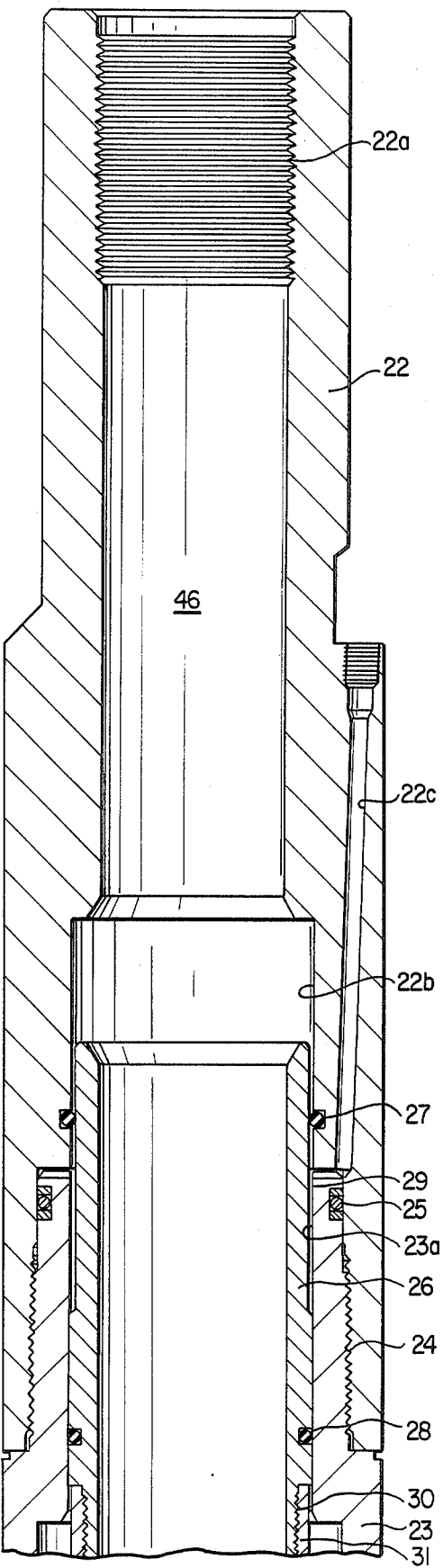
Figures 2B, 2C:
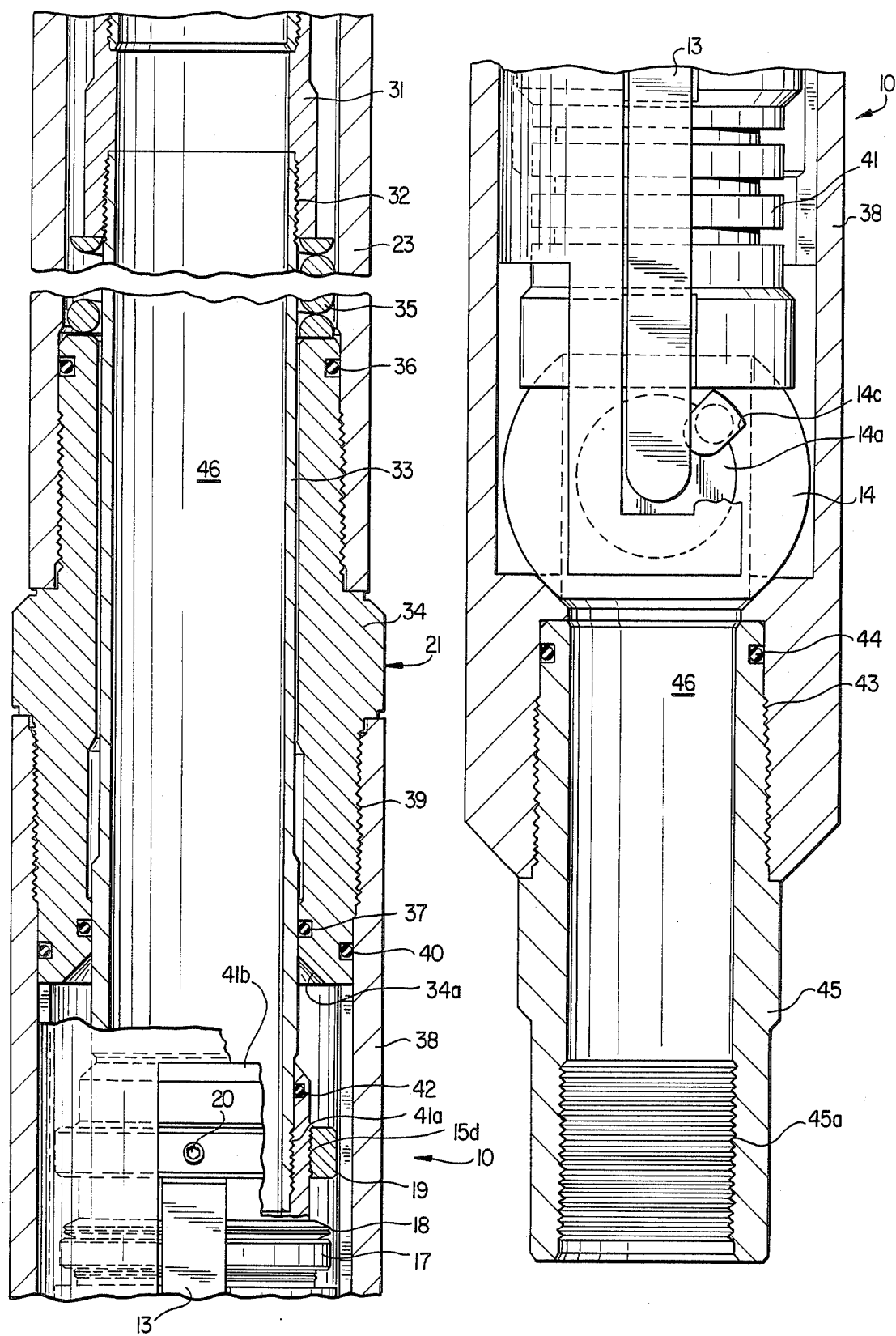

FIGS. 2A, 2B and 2C together is a drawing of a well safety valve utilizing the improved ball valve structure of this invention. This figure is almost completely half sectioned and shows the invention ball valve structure rotated 90° and in open position.

FIG. 1 shows the improved ball valve structure 10 housed in control housings 11 and 12. Each housing has a wall slot 11a and 12a and opposite and aligned pins 11b and 12b. Slidably mounted in each wall slot is a control arm 13. Each control arm has a pin 13a at one end and an internal shoulder 13b near the other end. Each control arm pin is engaged in a center hole 14b in opposite flat planar surfaces 14a on metal valve ball member 14. This valve ball also has opposite offset slots 14c in each flat surface. The valve ball has a spherical sealing surface 14d and a through opening for flow 14e.

Metal valve seat member 15 is provided with an annular sealing surface 15a, which is sealingly engageable with valve ball sealing surface 14d. The valve seat has a resilient section 15b, external threads 15c and 15d and an internal thread 15e. The cross section form of 15b is shown as "squared" convolutions. Vee or rounded convolution forms could be used. Threaded into thread 15e is a sleeve 16, which covers the inside of resilient section 15b. A ring 17 is threaded onto seat thread 15c below control arm shoulders 13b. Between ring 17 and shoulders 13b, a spring 18 is confined, biasing the control arms toward ring 19. Spring 18 is shown in the form of a belleville washer spring. A coil or wave spring form could be used. Threaded on seat thread 15d above the control arms is another ring 19, which has a threaded hole into which a set screw 20 has been installed.

FIGS. 2A, 2B and 2C together show a well safety valve 21 utilizing the improved metal ball valve structure 10. The safety valve has an upper body 22 having an appropriate thread 22a for connecting the safety valve in a well flow conductor or a wireline tool string. Body 22 is connected to intermediate body 23 with thread 24 and sealed in body 22 wirh resilient seal 25. A piston 26 is slidably mounted in bore 23a in the intermediate body and bore 22b in the upper body. This piston is sealed in bore 22b with resilient seal 27 and in bore 23a with resilient seal 28, and forms a variable volume pressure chamber 29 with bodies 22 and 23. There is an inlet passage 22c in the upper body for conducting pressured control fluid into pressure chamber 29.

Connected to the lower end or the piston with thread 30 is a connector 31, having a thread 32 into which is connected an operating tube 33. Disposed around the operator tube between the lower end of the piston and the upper end of body connector 34 is a spring 35. The intermediate body is sealed to the body connector with resilient seal 36.

The operating tube extends through connector 34 and is slidably sealed to the connector with resilient seal 37. A lower body 38 is connected to the body connector by thread 39 and sealed to it with resilient seal 40. Housed in the lower body is the improved ball valve structure 10 having a modified seat. The improved ball valve structure utilized in the safety valve includes a modified seat member 41 having a thread 41a and an annular metal valve sealing surface 41b, which is sealingly engageable with metal annular seat surface 34a on body connection 34. The lower end of the operator tube is connected to the seat member by thread 41a and the tube is sealed to the seat with resilient seal 42. Connected to the lower body by thread 43 and sealed with resilient seal 44 is a lower body connector 45, which has an appropriate thread 45a for connecting the safety valve into a well conduit or a wireline tool string. Flow passage 46 extends through the well safety valve.

The improved ball valve structure of FIG. 1 is operated in the conventional manner by moving seat member 15 and control arms 13 longitudinally downward to rotate ball member 14 around pins 11b and 12b to open position and by moving the seat upwardly to rotate the ball member back to closed position. If when pushing downwardly on the seat member, the ball does not rotate, seat on ball force may be limited to a preset value causing any further downward force to be transmitted to the valve ball through the control arms. If downward force imparted to the ball through the seat is limited to the compressive load on the resilient section 15b in the seat, anti-rotational ball seat friction forces are greatly reduced. The compressive load on the seat and section 15b can be controlled by positioning ring 19 so that anti-rotational friction force between the ball and sealingly engaged seat will increase with the coefficient of friction only. Because of the controlled load, the anti-rotational force does not increase with downward force on the seat. If follows that, an increased downward force on the seat increases rotational force imparted to the ball regardless of the frictional coefficient between ball sealing surface and seat sealing surface.

Ring 19 is properly positioned by first rotating ring 17 upwardly to move spring 18, control arms 13 and valve ball seal surface 14d into contact with seat seal surface 15a. Ring 17 is rotated upwardly further to compress spring 18 to exert an upward force of say 50 pounds on the control arms. This 50 pound force will be the force induced into resilient section 15b in the seat and will be the minimum seat on ball force. Next, ring 19 is rotated downwardly until it just contacts the control arms. Now, rotate ring 19 upwardly a small distance, say 0.005 inch, the distance desired to compress seat section 15b for limited seat on ball load. When section 15b is compressed, clearances between all parts are eliminated (except between the control arms and ring 19) and the seat is held in sealing engagement on the ball at all times as the ball is moved between closed and open positions. The valve ball will now rotate open when pushing down on the seat member.

To use the safety valve of FIG. 2, rings 19 and 17 should be properly positioned and ring 19 locked on the ball valve seat member 41 so the seat can be moved downwardly, rotating the ball member open.

The safety valve should then be lowered into a well conduit and set for operation. This ball type safety valve operates in the conventional manner. Pressured control fluid is introduced into passage 22c to act on piston 26 and move piston 26, operating tube 33, ball valve seat 41 downwardly, sealingly disengaging valve 41b from seat 34a while compressing spring 35 and imparting opening rotational forces to the ball through both seat and control arms until the valve ball reaches open position permitting flow upwardly through safety valve flow passage 46. Less control fluid pressure is required to open an improved ball valve structure wherein the seat on ball engaging force is controlled to reduce anti-rotational friction forces.

When the pressure in passage 22c is reduced sufficiently, spring 35 extends, moving the piston, operating tube and seat upwardly, closing the ball valve and sealingly engaging the valve 41b with seat 34a closing passage 46 to upward flow. Seated annular metal valve 41b protects and preserves dynamic resilient seal 37. As the diameter of the seat sealing surface 15a is larger than annular valve sealing surface 41b, any higher pressure below the closed safety valve ball valve acts through clearances between parts upwardly on the sealed area of seat 34a and downwardly on the larger sealed area of seat 15a on ball 14. The resulting down force extends the resilient section 15b in the seat member and, increases the force sealingly engaging the seat on the ball.

I claim:

1. A valve for mounting within a cylindrical housing having a through flow passage comprising:
   (a) a control housing having halves;
   (b) valve means in said control housing moveable longitudinally between open and closed positions for controlling flow through said flow passage, said valve means including a valve ball member sealingly engageable with a valve seat member, said seat member having resilient means formed integrally therein; and
   (c) means in said valve means for applying a force moving said seat member into sealing engagement with said ball member and for adjustably compressing said seat member resilient means to control the force sealingly engaging said seat member with said ball member.

2. The valve of claim 1 wherein each housing half has a slot therethrough and
   wherein the seat member further includes an annular sealing surface on one end, and external threads on the other end, and the valve means further includes a control arm slidably mounted in each of said housing half slots.

3. The valve of claim 2 wherein the integral resilient means in the seat member is formed of a number of equally spaced apart internal and external grooves, said internal grooves spaced one-half space from said external grooves.

4. The valve of claim 2 wherein the means for applying a force moving the seat into sealing engagement with the ball comprise:
   (a) a shoulder in each control arm; and
   (b) a ring threaded on the seat threads below said shoulders.

5. The valve of claim 4 further including biasing means between the control arms shoulders and ring.

6. The valve of claim 5 wherein the biasing means is a wave spring.

7. The valve of claim 5 wherein the biasing means is a coil spring.

8. The valve of claim 5 wherein the biasing means is a belleville spring.

9. The valve of claim 2 wherein the means adjustably compressing the seat member resilient means comprise:
   (a) a ring threaded on the seat above the control arms; and
   (b) means for locking said ring in position.

10. A valve in accordance with claim 9 wherein the means locking the ring in position are a hole through the ring wall and a screw threaded into said wall hole.

11. A valve for mounting within a cylindrical housing having a flow passage therethrough comprising:
   (a) a control housing having halves, each half having a slot therethrough and an offset pin therein;
   (b) valve means in said control housing moveable longitudinally between open and closed positions for controlling flow through said flow passage including a control arm slidably mounted in each of said housing half slots, each said arm having a pin at one end and an internal shoulder at the other end,
   a ball member having a spherical sealing surface and a pair of opposed parallel planar surfaces thereon, each planar surface having a hole in the center thereof and an offset slot therein, a control arm pin engaged in each said planar surface center hole and a control housing offset pin engaged in each ball planar surface slot,
   a seat member having biasing means integrally formed therein, an annular sealing surface on one end sealingly engageable with said ball sealing surface and external threads on the other end, and
   means in said valve means for applying a force moving said seat member into sealing engagement with said ball member and for adjustably compressing said seat member biasing means to control the force sealingly engaging said seat member with said ball member including
   a ring threaded on said seat member threads below said control arm shoulders,
   biasing means between said ring and said arm shoulders, and
   another ring threaded on said seat member threads above said control arms, said other ring having a a set screw therein.

12. A well safety valve having a flow passage therethrough comprising:
   (a) a body connectable in a well pipe string;
   (b) a control housing positioned in said body having halves;
   (c) valve means in said control housing moveable longitudinally between open and closed positions for controlling flow through said flow passage, said valve means including
   a valve ball member sealingly engageable with a valve seat member, said seat member having resilient means formed integrally therein,
   means in said valve means for applying a force moving said seat member into sealing engagement with said ball member and for adjustably compressing said valve seat resilient means to control the force sealingly engaging said seat with said ball;
   (d) annular valve means in said body moveable longitudinally between open and closed positions for controlling flow around said ball valve means; and
   (e) operator means for moving said ball valve means and said annular valve means between open and closed positions.

13. The safety valve of claim 12 wherein each housing half has a slot therethrough and wherein the seat member further includes an annular sealing surface on one end and external threads on the other end, and the valve means further includes
   a control arm slidably mounted in each of said said housing half slots.

14. The valve of claim 13 wherein the integral resilient means in the seat member is formed of a number of equally spaced apart internal and external grooves, said internal grooves spaced one-half space from said external grooves.

15. The safety valve of claim 13 wherein the means in the valve means for applying a force moving the seat into sealing engagement with the ball include a shoulder in each control arm and a ring threaded on the seat threads below said shoulders.

16. The safety valve of claim 15 wherein the means for applying a force further include biasing means between the control arm shoulders and the ring.

17. The safety valve of claim 16 wherein the biasing means is a wave spring.

18. The safety valve of claim 16 wherein the biasing means is a coil spring.

19. The safety valve of claim 16 wherein the resilient bias is a belleville spring.

20. The safery valve of claim 13 wherein the means in the valve means for controlling the force sealingly engaging the seat on the ball include a ring threaded on said seat above the control arms and means for locking said ring in position.

21. The safety valve of claim 20 wherein the locking means are a hole through the ring wall and a screw threaded into said hole.

22. The safety valve of claim 12 wherein the operator means comprise:
   (a) longitudinally moveable means in said body for moving said valve means to open position;
   (b) an operator tube slidably sealed in the valve body and connecting said moveable means to the valve means seat; and
   (c) biasing means biasing said moveable means toward valve means closed position.

23. The safety valve of claim 22 wherein the moveable means include a piston in the body forming a variable volume chamber therewith and an inlet for pressured fluid in said chamber.

24. The safety valve of claim 12 wherein the biasing means comprise:
   (a) a shoulder in the valve body below the piston; and
   (b) a spring around the operator tube between said piston and shoulder.

25. The safety valve of claim 12 further including annular valve means in the body moveable between open and closed positions by said operator means.

26. The safety valve of claim 25 wherein the annular valve means comprise:
   (a) an annular seat in the valve body; and
   (b) an annular valve member on the upper end of the ball seat member sealingly engageable with said annular seat.

27. The safety valve of claim 26 wherein the sealed diameter between the ball and seat member is greater than the sealed diameter between the annular valve member and body seat.

28. A well safety valve having a flow passage therethrough comprising:
   (a) a body connectable in a well pipe string;
   (b) a control housing having halves positioned in said body, each half having a slot therethrough and an offset pin therein;
   (c) ball valve means in said control housing moveable longitudinally between open and closed positions for controlling flow through said flow passage, said valve means including
      a control arm slidably mounted in each of said housing half slots, each said arm having a pin at one end and an internal shoulder at the other end, a valve ball member having a spherical sealing surface and a pair of opposed parallel planar surfaces thereon,
      each said planar surface has a hole, in the center thereof and an offset slot therein, and a control arm pin engaged in each planar surface center hole and a control housing offset pin engaged in each ball planar surface slot,
      a seat member having an annular sealing surface on one end sealingly engageable with said ball sealing surface, biasing means integrally formed therein, and external threads on the other end of said seat, and
      means in said valve means for applying a force moving said seat member into sealing engagement with said ball member and for adjustably compressing said seat member resilient means to control the force sealingly engaging said seat member with said ball member including
         a ring threaded on said seat member above said control arms, said ring having a set screw therein,
         another ring threaded on said seat threads below said control arm shoulders,
         biasing means between said other ring and said shoulders;
   (d) annular valve means in said body moveable longitudinally between open and closed positions for controlling flow around said ball valve means including
      an annular seat in the safety valve body, and an annular valve on the upper end of the ball seat member sealingly engageable with said body annular seat; and
   (e) operator means for moving said ball valve means and annular valve means between open and closed positions including
      a piston in the body forming a variable volume chamber therewith and an inlet for pressure in said chamber,
      an operator tube, slidably sealed in the valve body and connecting said piston to the ball seat member, a shoulder in the valve body below the piston, and a spring around the operator tube between said piston and shoulder.

* * * * *